United States Patent [19]

Cappellari et al.

[11] Patent Number: 5,460,085
[45] Date of Patent: Oct. 24, 1995

[54] PROCESS FOR COMPACTING WASTE MATERIALS

[76] Inventors: Roberto Cappellari, Vai Austria, 46, 30010 Treporti (Province of Venezia); Angelo Odorico, Via Varmo, 8, 33050 Rivignano (Province of Udine), both of Italy

[21] Appl. No.: 312,908

[22] Filed: Sep. 29, 1994

Related U.S. Application Data

[63] Continuation-in-part of Ser. No. 13,985, Feb. 5, 1993, abandoned, which is a continuation of Ser. No. 659,764, Feb. 25, 1991, abandoned.

[30] Foreign Application Priority Data

Mar. 5, 1990 [IT] Italy ................... 41548 A/90

[51] Int. Cl.⁶ ............... B30B 9/04; B30B 15/34
[52] U.S. Cl. ............... 100/37; 100/38; 100/92; 100/126; 100/137; 100/215; 100/221; 34/398
[58] Field of Search ............... 100/35, 37, 38, 100/70 R, 91, 92, 104, 110, 116, 126, 137–139, 177, 178, 215, 221, 222, 93 P, 93 RP; 34/12–14, 17, 60, 61, 62, 69, 70, 388, 398

[56] References Cited

U.S. PATENT DOCUMENTS

| | | | |
|---|---|---|---|
| 1,445,314 | 2/1923 | Henry | 100/93 P |
| 1,779,810 | 10/1930 | Harritt | 34/14 X |
| 1,946,814 | 2/1934 | Sims | 100/38 X |
| 2,135,763 | 11/1938 | Nicholson | 100/222 X |
| 2,566,943 | 9/1951 | King | 100/92 X |
| 3,304,855 | 2/1967 | Oebell | 100/116 |
| 3,514,921 | 6/1970 | Tezuka | 100/137 X |
| 3,895,997 | 7/1975 | Haywood . | |
| 3,895,998 | 7/1975 | Haywood . | |
| 4,232,600 | 11/1980 | Le Jeune | 100/37 |
| 4,270,447 | 6/1981 | Gregorovic | 100/70 R |
| 4,303,412 | 12/1981 | Baikoff | 100/37 |
| 4,389,928 | 6/1983 | Burgin | 100/37 |
| 4,510,363 | 4/1985 | Reynolds, Jr. | 100/92 X |
| 4,706,560 | 11/1987 | Capodicasa | 100/93 P X |

FOREIGN PATENT DOCUMENTS

| | | | |
|---|---|---|---|
| 671388 | 10/1963 | Canada | 100/93 P |
| 0016734 | 10/1980 | European Pat. Off. . | |
| 0202605 | 11/1986 | European Pat. Off. . | |
| 2061755 | 6/1972 | Germany | 100/70 R |
| 3804826 | 8/1989 | Germany . | |
| 434643 | 2/1949 | Italy | 100/177 |
| 519644 | 11/1957 | Italy | 100/93 P |
| 0924827 | 5/1963 | United Kingdom . | |

*Primary Examiner*—Stephen F. Gerrity
*Attorney, Agent, or Firm*—Guido Modiano; Albert Josif

[57] ABSTRACT

Process for compacting and removing liquid from liquid containing waste materials including the steps of feeding the waste materials into compaction chambers, simultaneously compressing and heating the waste materials inside the compaction chambers, and removing liquid from the waste materials during the steps of compressing and heating.

6 Claims, 3 Drawing Sheets

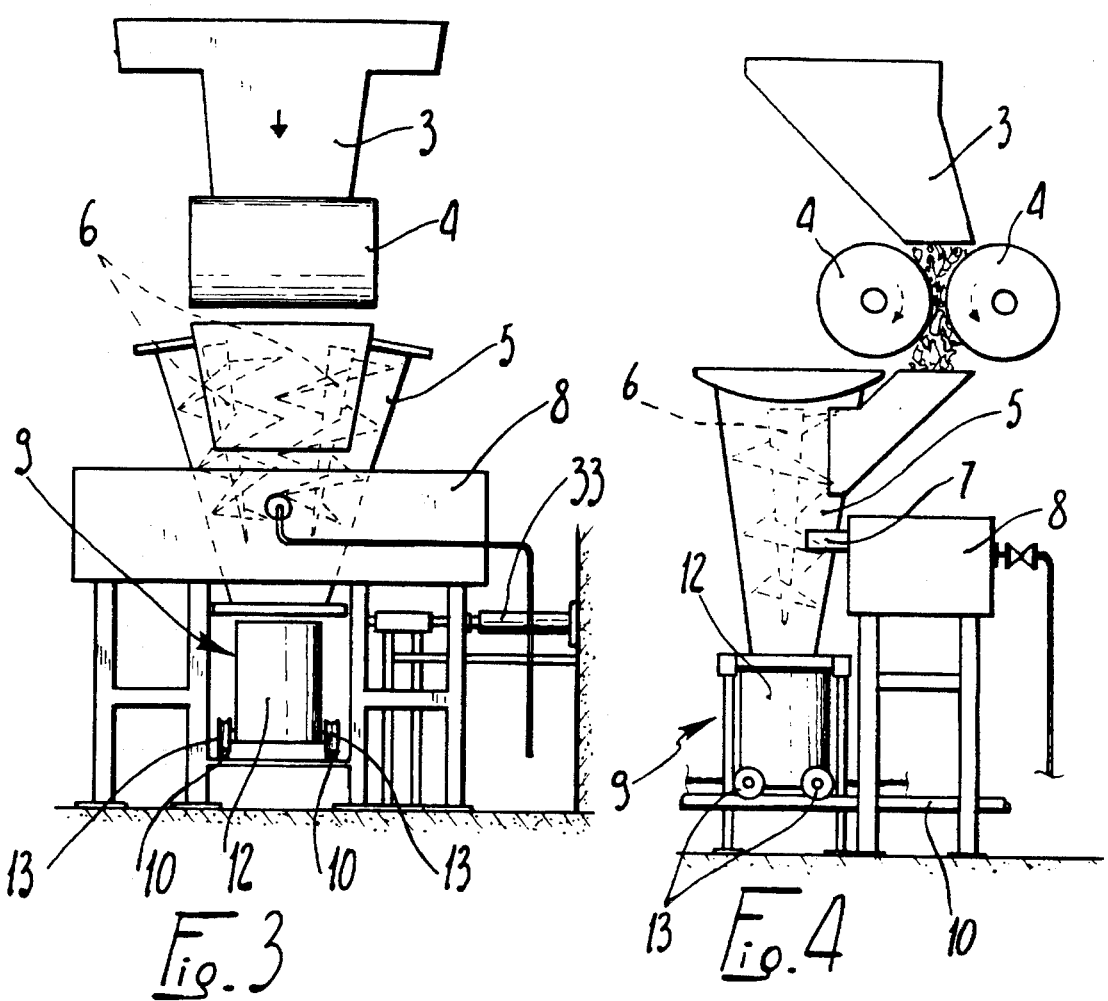
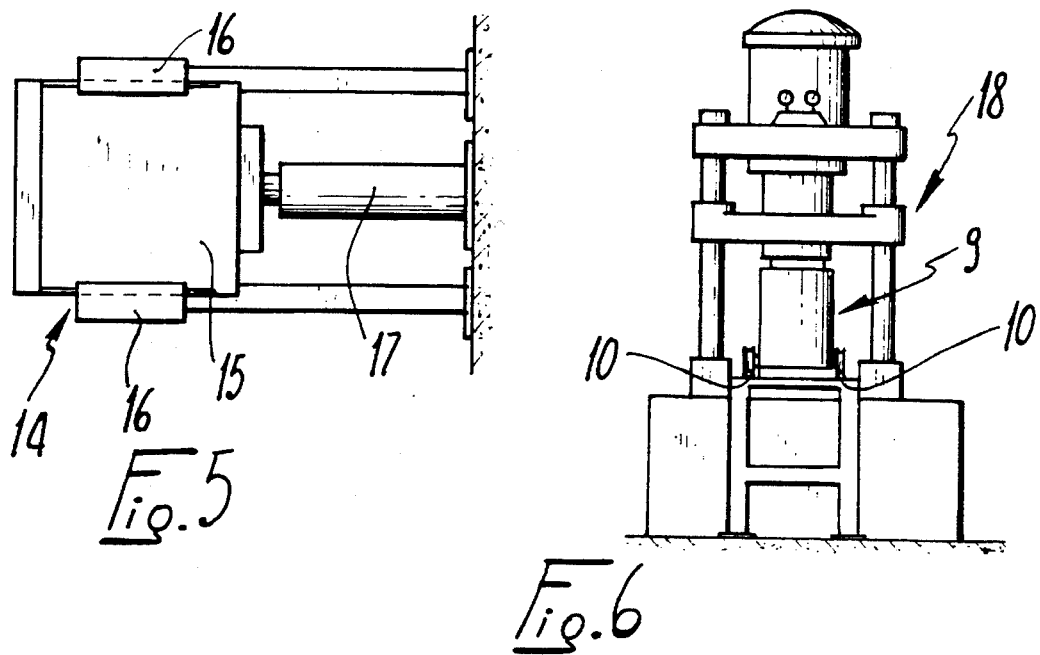

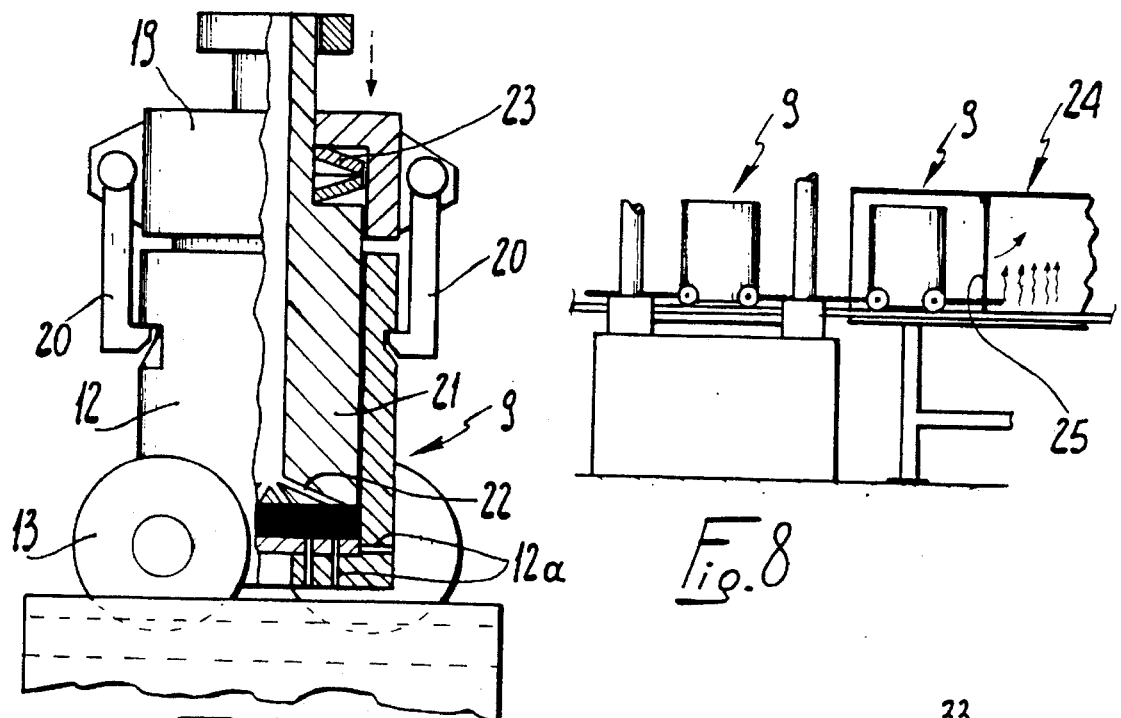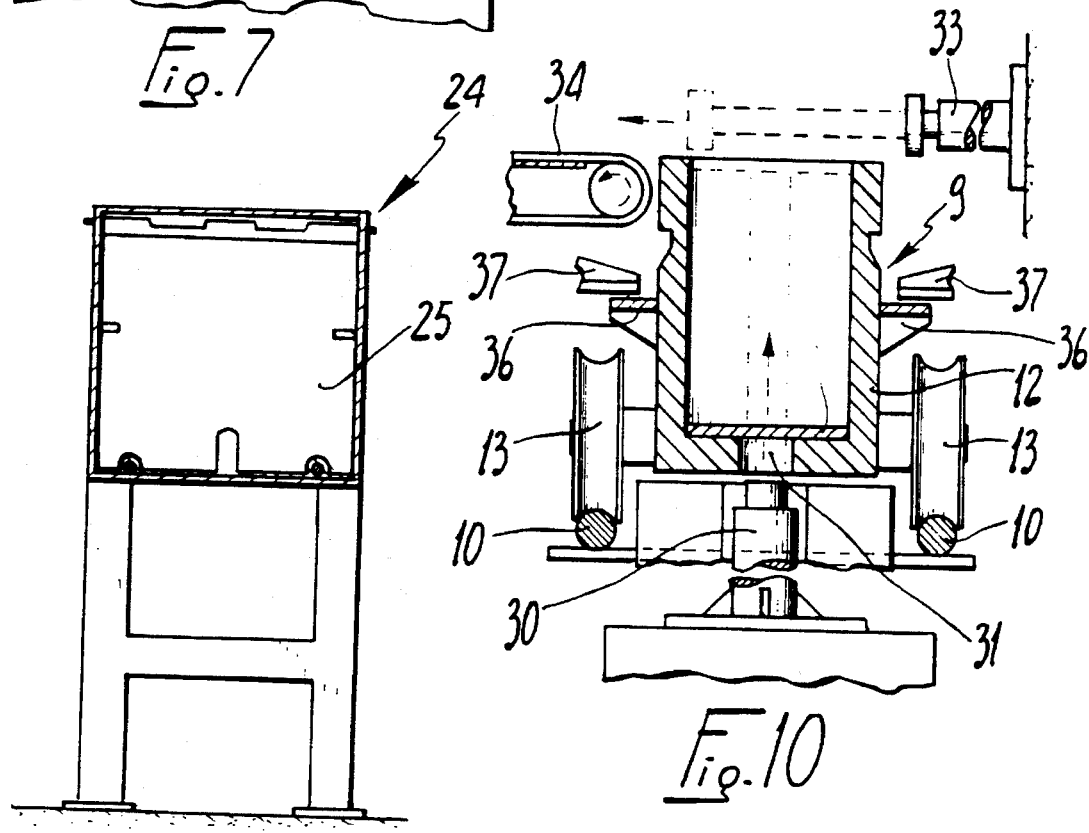

PROCESS FOR COMPACTING WASTE MATERIALS

This application is a continuation-in-part application of application No. 08/013,985 filed on Feb. 5, 1993, now abandoned, which in turn was a continuation application of application No. 07/659,764 filed Feb. 25, 1991, now abandoned.

BACKGROUND OF THE INVENTION

The present invention relates to a process for compacting waste materials, such as urban, industrial or similar waste materials and also special hospital waste and the like, etc., and to the apparatus for performing such process.

Compaction as a process for the disposal of urban, industrial or similar waste materials is currently not very widespread due to a series of technical and conceptual difficulties related to the difficulty in providing valid, effective, reliable and economical apparatuses.

The technical and conceptual difficulties in experimentation, design and execution of waste compaction processes and apparatuses are many and differ from one another, but they can be substantially grouped within the scope of a single common denominator, which is constituted by the problem of the continuous variation of the physical and chemical characteristics of the waste being compacted.

The main structural-functional characteristic of the variations of the waste during compaction is constituted by the so-called "delayed liquid phase", which determines its tendency toward non-compactibility.

During a conventional compaction of waste, two phases are in fact distinguished with reference to the separation of the liquids:

an immediate liquid phase, which manifests itself with the appearance of liquids when compaction begins;

a delayed liquid phase, which follows the preceding phase and, if it is not caused to manifest itself, blocks the continuation of the compaction due to the principle of incompressibility of liquids.

SUMMARY OF THE INVENTION

The aim of the present invention is to provide a process for compacting urban, industrial or similar waste materials which can cause the manifestation of the delayed liquid phase and separate it from the compacted materials.

A consequent primary object is to provide a process and an apparatus for performing it which do not have negative environmental impact aspects.

Another important object is to provide a process and the related apparatus for its execution which have positive large-scale and wide-ranging induced effects in territorial, constructive, economical, environmental, ecological and social situations.

Not least object is to solve the urgent problem currently constituted by the disposal of urban, industrial and special waste, and of urban, industrial, special hospital and similar sludge, etc.

This aim, these objects and others which will become apparent hereinafter are achieved by a process for compacting and removing liquid from liquid containing waste materials which includes the steps of feeding the waste materials into a compaction chamber, simultaneously compressing and heating the waste materials inside the compaction chamber, and removing liquid from the waste materials during the steps of compressing and heating. The apparatus according to the present invention for performing such process includes a metallic drum for containing the waste materials, a lid element fixable on the metallic drum, a compression piston which is spring-biased inside the metallic drum, liquid discharge holes provided respectively in the bottom of the metallic drum and in the piston, and a heating tunnel through which a plurality of metallic drums with continuously compressed waste materials therein is conveyed.

BRIEF DESCRIPTION OF THE DRAWINGS

Further characteristics and advantages of the invention will become apparent from the detailed description of the operating steps of the process and of an embodiment of the apparatus for its execution, which are given by way of non-limitative example.

The apparatus for the execution of the process is illustrated, again by way of non-limitative example, in the accompanying drawings, wherein:

FIGS. 3 and 4 are side views of the section of the apparatus which is assigned to the first compression of the materials;

FIG. 5 is a top detail view of a shearing unit arranged below the feeding means of the compaction containers;

FIG. 6 is a view of the compaction press arranged after the container filling region;

FIG. 7 is a sectional view of the pressing means;

FIG. 8 is a view of the apparatus in the inlet region of the heating tunnel;

FIG. 9 is a front view of the inlet of the heating tunnel;

FIG. 10 is a sectional detail view of the station for unloading the compacted materials.

DESCRIPTION OF THE PREFERRED EMBODIMENTS

Figure 1:
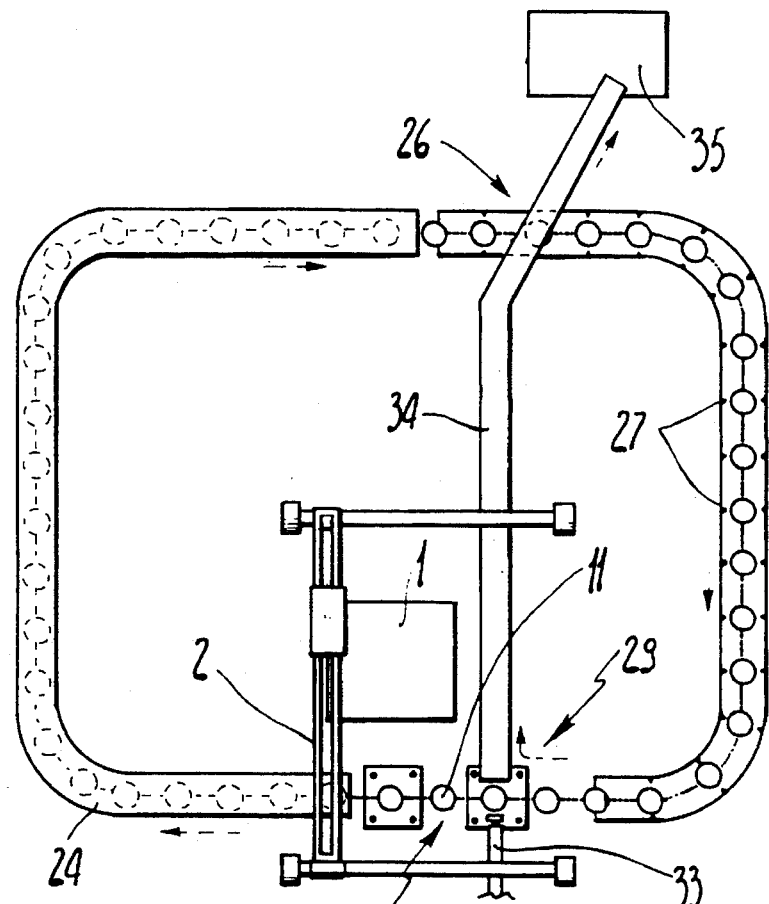
FIG. 1 is a schematic top view of the apparatus.
Figure 2:
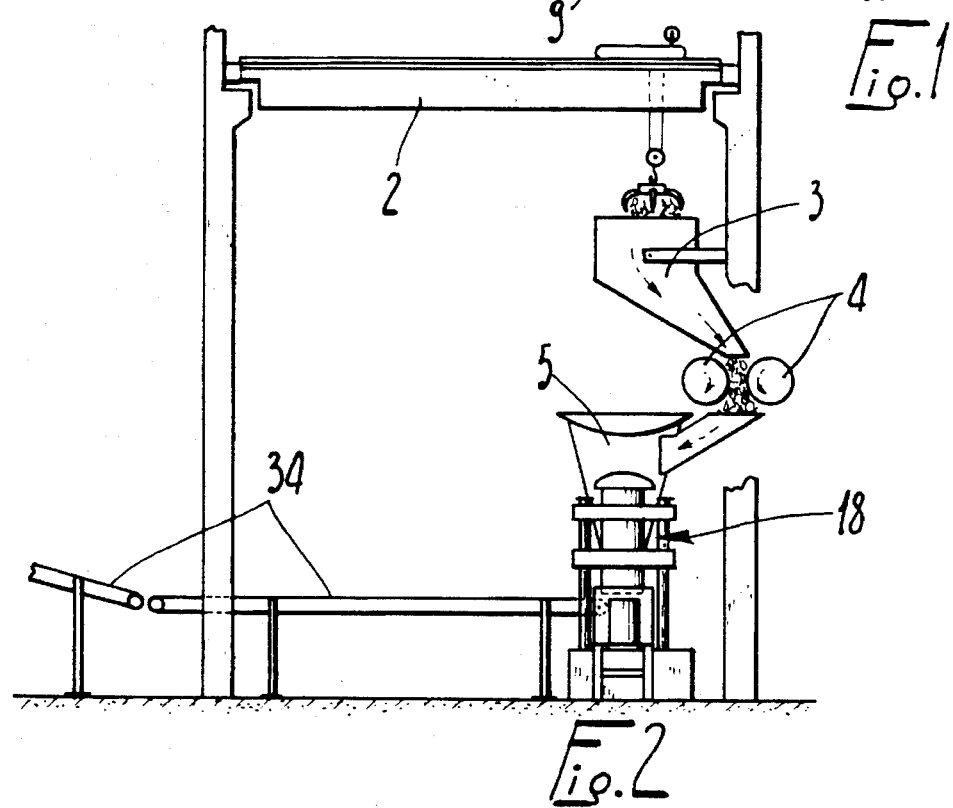
FIG. 2 is a side view of the region of the apparatus which is assigned to the loading of the materials to be compacted and to the unloading of the compacted materials.

With reference to the above figures, the waste materials, after being unloaded into a container 1, are loaded by means of a bridge crane 2 into a container 3 with a funnel-shaped bottom which is suitable for unloading them between a pair of parallel rotating rollers 4.

The materials thus undergo a first compression and squeezing which separates a first liquid phase (the immediate liquid phase).

The pre-compacted materials then fall into a hopper 5 which is arranged vertically, has a perforated bottom, and inside which a double converging variable-pitch mixing scroll 6 is arranged.

The separation of the first liquid phase continues in said hopper 5; said phase is removed by means of a pipe 7 and discharged into a containment tank 8 provided with a related discharge gate valve.

Said hopper 5 is arranged above a station on which a wheeled container 9 is located; said container can slide on a railed transfer line 10 and belongs to a series of containers of the same type which are aligned at mutually equal distances and are associated by chains 11; each container defines a self-compaction chamber.

As can be seen in FIG. 1, the transfer line 10 is conveniently closed in a loop, and the chain formed by the containers 9 is also closed in a loop.

Each of said containers 9 is constituted by a strong metallic drum 12 with a cylindrical shape, with liquid discharge holes 12a on its bottom and with wheels 13 in a downward position.

When each container 9 which is waiting below the hopper 5 is filled, a shearing unit 14, arranged below the hopper 6, is activated; said shearing unit is suitable for separating the materials which, by virtue of the preceding treatments, are uniform and continuous.

Said shearing unit 14 is substantially composed of a horizontal blade 15 which can slide on guides 16 and is actuated by a piston 17.

After filling, each container 9 passes below a compacting press 18, the pressing part whereof comprises a lid 19 which is automatically fixed to the container at the end of compression by means of hooks 20 arranged at diametrically opposite positions.

A piston 21 is arranged axially and is slidably associated with said lid 19, and discharge holes 22 extend from its pressing surface.

Said piston 21 is suitable for maintaining a continuous pressure on the materials with which the container 9 has been filled.

Alternatively, various layers of waste materials (preferably three), intercalated by appropriate flanges and always pressed by said piston 21, can be arranged inside each container 9.

Cup-shaped springs 23 are conveniently arranged between the piston 21 and the lid 19 and are suitable for keeping the hooks 20 under tension and therefore for keeping the lid 19 rigidly associated with the drum 12.

By subsequently exerting a compression on the lid 19 in contrast with the action of the cup-shaped springs 23, the hooks 20 can be released and the drum 12 can be freed from the piston 21.

The separation of a second liquid phase (the delayed liquid phase) occurs in this second compression step and in a subsequent heating step with compression in a self-compaction chamber.

The heating step is performed by passing each container 9 inside a tunnel 24, conveniently with a raisable closure door 25, inside which a high temperature (by way of indication, 300/400 degrees Celsius) and a high pressure are maintained.

This allows the further evaporation of the liquids still contained in the compacted materials.

After the heating step, each container 9 is passed through a tunnel 26 inside which sprays of cold water 27 cool said container 9 and therefore the compacted materials.

An unloading station 29 is arranged at the exit of the tunnel 26 and comprises a piston 30 which arranges itself below each container 9 and, by entering in said container through a hole 31 of its bottom, causes a compacted block 32 to rise; by means of a horizontal piston 33 which is arranged above, said block is transferred onto a conveyor belt 34 which unloads it into a collection container 35.

In order to prevent the action of the piston 30 from also raising the drum 12 due to adhesion of the compacted block 32 to the bottom, said drum has lateral tabs 36 which, when the container 9 is set in place, abut with other tabs 37 which are arranged above them and extend from the structure of the unloading station 29.

The first compression which takes place at the rotating rollers 4 occurs at ambient temperature and with a pressure exerted on the waste materials of approximately 3,000 tons force per square meter of waste material, so as to effectively prepare the waste materials for the subsequent steps, by removing approximately 50 percent of the original liquid content of the waste materials and by sufficiently reducing the rigidity of the waste materials.

The successive compression of the waste materials which takes place in the compaction chambers 9 occurs with a pressure exerted on the waste materials of approximately ten or more times less than the pressure exerted during the first compression, therefore at a pressure of about 300 tons force per square meter of waste material. This pressure has been found to effectively compress the waste materials in the compaction chambers while achieving a satisfactory liquid flow out of the liquid discharge holes 12a.

The compaction chamber is adapted for the compaction process such that approximately 10 tons of waste materials may be initially accommodated in each compaction chamber. After compaction, stable blocks are formed with a volume of approximately 4.5 cubic meters, a weight of approximately 7.5 tons, and a specific weight of about 1600 kg per cubic meter.

The above described process and the apparatus for its execution produce a division of the compaction actions which is aimed at achieving the complete separation of the immediate and delayed liquid phases.

A complete dehumidification and dehydration of the compacted materials is thus obtained, achieving a considerable reduction of the volume of the mass.

The complete elimination of the liquid phase from the compacted materials allows to stabilize said materials from a physical and chemical point of view.

It should furthermore be noted that the compaction action, combined with the thermal action, disinfects and disinfests the compacted materials.

The toxic and harmful elements are precipitated in the form of insoluble or scarcely soluble compounds and are subjected to an action of thermal destruction and inactivation, or are compacted and agglomerated in the mass, which can be subsequently wrapped with a protective covering.

The compacted blocks can be reused as they are or with additives for the execution of structures such as embankments or other structures.

As regards the order of magnitude of the volume and weight reductions obtained with the process according to the invention, it is possible to achieve, by way of indication, reductions of 16–17 times by volume with respect to the original and of 30% by weight.

As regards environmental impact problems, the apparatus does not pollute the air, water or soil in any way; the liquid phases extruded as such or in vapor form are condensed and collected; from collection they pass to complete conditioning (or to other systems) with final emission of the water alone, since the conditioning waste is normally reintroduced into the compacted materials.

No gases or other air pollutants furthermore escape from the apparatus, not merely according to the statutory provisions, which provide for maximum allowable concentrations (as for incinerators, exhausts, etc.) and therefore according to a relative criterion (concentrations), but in absolute terms.

The apparatus does not emit odors, and the compacted materials have no foul odors, are not unsightly, do not percolate, are sterilized and thermally detoxified, and are hard, stable and inert.

The process, and therefore the apparatus, entail no kind of combustion, and the heat increase (300–400 degrees Celsius) is performed in the complete absence of air and oxygen, with the consequent absence of any form of combustion.

The products resulting from compaction are in no way polluting, are compact, stable, dry, highly resistant to ordinary chemical-physical agents, highly resistant to compression and to other mechanical parameters, practically dehydrated and cannot be used as food for animals and parasites.

Other positive effects related to the execution of the process according to the invention are constituted by an improvement in the general conditions of landfills, by the decrease in the number of landfills required and in their capacity, by the possibility of eliminating landfills, since the compacted materials can be reused both as they are and with additives, as previously mentioned, for foundations, reclamations, embankments, roads, etc.

Other positive aspects consist in reducing the need for breaking up and ruining the territory for excavations and for destructions of the balances of the earth's surface to produce construction materials: gravel, sand, etc.; equivalent amounts of material for suitable purposes can be provided by the compacted materials.

Finally, it should be furthermore noted that the disposal of waste can even be performed on-site by providing small apparatuses.

The apparatus can naturally also be mounted so as to be mobile on trucks or boats for ordinary activities or for emergencies and natural or accidental disasters.

In practice it has thus been observed that the invention has achieved the intended aim and objects.

The invention thus conceived is susceptible to numerous modifications and variations, all of which are within the scope of the inventive concept.

All the details may furthermore be replaced with other technically equivalent elements.

The process as described is susceptible to further modifications and integrations without thereby abandoning the scope of the protection of the invention.

In practice, the materials employed for the apparatus and the dimensions may be any according to the requirements.

We claim:

1. A process for compacting and removing liquid from liquid containing waste materials, comprising the steps of: subjecting the waste materials to at least one initial compression and separating liquid from the waste materials during said at least one initial compression, providing a plurality of compaction chambers each having an inside area suitable for containing the waste materials; providing liquid discharge hole means in said plurality of compaction chambers in communication between the inside areas and outside of said plurality of compaction chambers for liquid flow from the inside areas to outside of the plurality of compaction chambers; feeding the waste materials into the inside areas of said plurality of compaction chambers; compressing the waste materials inside each of said compaction chambers; transporting in unison said plurality of compaction chambers through a heating station; heating the waste materials inside each of said compaction chambers at said heating station and during said step of compressing thereof; removing liquid from the waste materials by means of liquid flow from inside of the plurality of compaction chambers to outside of the plurality of compaction chambers through said liquid discharge hole means holes provided in said plurality of compaction chambers during said steps of compressing and heating, thereby performing simultaneously compressing with continuous pressure on the waste materials inside the plurality of compaction chambers and heating of the waste materials inside the plurality of compaction chambers and removal of liquid from the waste materials for reduction of volume of the waste materials inside each of the plurality of compaction chambers; transporting in unison, after said step of removing liquid, said plurality of compaction chambers through a cooling station; and compressing the waste materials inside said compaction chambers while simultaneously cooling the waste materials at said cooling station, thereby performing simultaneous compressing with continuous pressure on the waste materials and cooling of the waste materials inside each of the compaction chambers.

2. A process according to claim 1, wherein the step of said initial compression comprises compressing the waste materials with a pressure of substantially 3000 tons force per square meter of waste material, and wherein the step of compressing the waste materials inside each of said compaction chambers comprises compressing the waste materials with a pressure of substantially 300 tons force per square meter of waste material.

3. A process according to claim 1, further comprising the steps of: removing the waste materials from said compaction chambers after said step of simultaneous compressing and cooling; and conveying the waste materials after said step of removing to a collection container.

4. A process according to claim 1, wherein said step of heating occurs at a temperature comprised between 300 and 400 degrees Celsius.

5. A process according to claim 1, wherein said step of transporting in unison said plurality of compaction chambers through a cooling station includes transporting in unison said plurality of compaction chambers through a cooling station comprising means for spraying cooling liquid on said plurality of compaction chambers.

6. A process according to claim 1, wherein the step of said initial compression comprises compressing the waste materials with a pressure of substantially 3000 tons force per square meter of waste material, and wherein the step of said compressing the waste materials inside each of said compaction chambers comprises compressing the waste materials with a pressure of substantially 300 tons force per square meter of waste material, and wherein said step of heating occurs at a temperature comprised between 300 and 400 degrees Celsius, and wherein said step of transporting in unison said plurality of compaction chambers through a cooling station includes transporting in unison said plurality of compaction chambers through a cooling station comprising means for spraying cooling liquid on said plurality of compaction chambers.

* * * * *